United States Patent [19]
Cain et al.

[11] Patent Number: 5,731,027
[45] Date of Patent: Mar. 24, 1998

[54] HEALTHY FAT-CONTAINING BLENDS

[75] Inventors: Frederick William Cain, Voorburg, Netherlands; Paul Thomas Quinlan; Kevin Warren Smith, both of Bedford, Great Britain; Nico Zwikstra, Heemstede, Netherlands

[73] Assignee: Loders-Croklaan B.V., Wormerveer, Netherlands

[21] Appl. No.: 652,432

[22] PCT Filed: Nov. 23, 1994

[86] PCT No.: PCT/EP94/03881

§ 371 Date: May 21, 1996

§ 102(e) Date: May 21, 1996

[87] PCT Pub. No.: WO95/14392

PCT Pub. Date: Jun. 1, 1995

[30] Foreign Application Priority Data

Nov. 29, 1993 [EP] European Pat. Off. ............ 93309482

[51] Int. Cl.$^6$ ............................................ A23D 7/00
[52] U.S. Cl. ........................ 426/607; 426/613; 426/606
[58] Field of Search .................... 426/606, 607, 426/603, 613

[56] References Cited

U.S. PATENT DOCUMENTS

| | | | |
|---|---|---|---|
| 4,414,239 | 11/1983 | Oven | 426/613 |
| 4,594,259 | 6/1986 | Baker | 426/613 |
| 4,610,884 | 9/1986 | Lewis | 426/613 |
| 4,670,272 | 6/1987 | Chen | 426/613 |
| 4,707,374 | 11/1987 | King | 426/613 |
| 4,711,788 | 12/1987 | Porcello | 426/613 |
| 4,753,812 | 6/1988 | Wilson | 426/613 |
| 4,824,684 | 4/1989 | Barry | 426/613 |
| 4,826,696 | 5/1989 | Wilson | 426/613 |
| 5,154,942 | 10/1992 | Hirschey | 426/613 |
| 5,326,582 | 7/1994 | Hair | 426/613 |
| 5,464,649 | 11/1995 | St. John | 426/613 |

FOREIGN PATENT DOCUMENTS

| | | |
|---|---|---|
| 0209176 | 1/1987 | European Pat. Off. |
| 500 178 | 8/1992 | European Pat. Off. |
| 502 697 | 9/1992 | European Pat. Off. |
| 547 651 | 6/1993 | European Pat. Off. |
| 555 917 | 8/1993 | European Pat. Off. |

*Primary Examiner*—Carolyn Paden
*Attorney, Agent, or Firm*—Cushman Darby & Cushman Intellectual Property Group of Pillsbury Madison & Sutro LLP

[57] ABSTRACT

Blends of sugar and a triglyceride component, wherein the triglyceride component comprises $\geq 40\%$ SU$_2$ and 3–50% S$_2$U while its N$_{20}$>35 and its N$_{30}$<10

(S=saturated fatty acid 18–24 C atoms, U=unsaturated fatty acid $\geq$18 C atoms)

are suitable for the preparation of low-SAFA filling fat compositions or low-SAFA ice-cream coatings.

17 Claims, No Drawings

HEALTHY FAT-CONTAINING BLENDS

This application claims benefit of international application PCT/EP03881, filed Nov. 23, 1994.

Blends of a sugar and a fat component are often used in temperature conditions. Examples of the above products are encapsulated fillings, such as pralines and ice-cream products provided with a coating, containing such blends. A problem with the known blends was that so far high SAFA contents (=contents of saturated and/or trans-fatty acids in the triglyceride component) had been required in order to achieve the required product performance, such as acceptable texture and good oral melting characteristics. Alternatively, the product performance, in particular the hardness and cool-melting behaviour, was unsatisfactory when lower SAFA contents were applied.

BACKGROUND OF THE INVENTION

According to EP 547,651 chocolate fillings comprise, as a fat phase, a fat containing 18–28 wt. % of $C_{16}$–$C_{18}$ saturated fatty acids, 35–45 wt. % of trans-unsaturated fatty acids and 25–35 wt. % of cis-unsaturated fatty acids. Therefore, these compositions are high in SAFA and are not free of trans-acids.

According to EP 555,917 filling fats comprise non-temper, non-trans fats comprising: 35–80 wt. % of the polymorphic SOS fat; less than 3 wt. % of the trisaturated $S_3$; 7–60 wt. % of ($U_2S+U_3$) triglycerides and less than 40 wt. % of SSU-triglycerides while the SUS:SSU ratio <6.

These fats will be relatively high in SAFA while the triglycerides display such a solid fat content at 20° C. (=$N_{20}$) that the $N_{20}$/SAFA ratio is low. This last requirement makes the fats not optimal for our purpose as filling fat or as ice-cream coating fat.

In EP 500,178 we have disclosed non-lauric, non-temper filling fats with an N-line of : $N_{20}$>45; $N_{30}$<12 and $N_{32.5}$<2.0. These fats can be obtained as olein fraction of the fractionation of a hardened mixture of, e.g., soybean oil and palm oil olein or cottonseed oil. The last-mentioned requirement means that the fats are not trans-free and are high in SARA.

In EP 502,697 fats are disclosed, that can be used in frozen dessert applications. The fats comprise 10–90 % $SU_2$; 10–85% $S_2U$, while the $S_2U$ consists for at least 35 wt % of $S_2L$ (L=linoleic acid). Therefore these fats are relatively rich in linoleic acid.

SUMMARY OF THE INVENTION

We have now found new blends of at least a sugar and a triglyceride component that can be applied in confectionery products, wherein the SAFA content of the triglyceride component is lower than that usually applied, while the products obtained display a performance similar to that of products based on fats with high SAFA levels. It should be understood that by SAFA content the total of saturated and trans-unsaturated fatty acid residues is meant.

Therefore, our invention concerns blends of a sugar component and a triglyceride component, the triglyceride component comprising:

at least 40 wt. % of $SU_2$ triglycerides;

3–50 wt. % of $S_2U$ triglycerides, while the $S_2U$ - component comprises SLnS and SOS in a weight - ratio <0.35, which triglyceride component displays a solid fat content (N) at the temperature indicated of:

$N_{20}$>35, preferably >60;

$N_{30}$<10, preferably <5, (N measured by NMR-pulse for fats stabilised for 40 hours at 20° C.) S being saturated fatty acid with 18–24 C atoms and U being unsaturated fatty acid with >18 C atoms, O being oleic acid and t being linoleic acid.

The triglyceride component in these blends has a SAFA content of at most 45 and is substantially free of trans-unsaturated fatty acid residues. Therefore, our blends are healthier than the common blends known for this purpose. Very suitable blends are obtained when the triglyceride component of the blend displays a ratio between its $N_{20}$ (stab. at 20° C.) and its SAFA content, so $N_{20}$/SAFA, of more than 1.2, in particular more than 1.5.

DETAILED DESCRIPTION OF THE INVENTION

Suitable triglyceride compositions that fulfil the above-mentioned criteria are triglyceride compositions rich in BOO, StOO, OStO, OBO or mixtures thereof. These compositions will also contain BOB, BBO, StOSt or StStO as the $S_2U$ component. Such triglycerides can be made by interesterification of natural fats, in particular by applying chemical or enzymic interesterification, using a fatty acid as a source for the fatty acid moiety that has to be introduced into the natural fat. The above-mentioned interesterification techniques are standard techniques (B=Behenic; St=Stearic; O=Oleic).

In the above blends, preferably 35–75 wt. %, more preferably 40–65 wt. %, of the triglyceride component is present. The sugar component can be any known sugar, such as glucose, fructose, sucrose, maltose, maltodextrin, etc., the nature of which is not critical. It should be understood that polydextrose-type materials are also considered to be part of the sugar component and can therefore also be applied.

In addition to the triglyceride component mentioned above, the blend can also contain a liquid oil, such as soybean oil, sunflower oil, maize oil, olive oil, hazelnut oil, groundnut oil or rapeseed oil. If the blend contains a liquid oil and a triglyceride rich in SOO, it is preferred to apply a weight ratio of liquid oil: SOO=(10–90):(90–10).

Very good results can be obtained if our blends comprise a triglyceride component that contains at least 10 wt. %, preferably at least 25 wt. %, of behenic acid. The behenic acid causes the digestibility of the triglycerides to decrease and therefore the calorific value of the blend is decreased as compared with normal fat components (based on $C_{12}$–$C_{18}$ fatty acids).

Although the triglyceride component, $S_2U$, also comprises StUSt (St=stearic acid), it is preferred that our triglyceride component contains less than 25 wt. % of StUSt (U=unsaturated fatty acid, $C_{18}^+$). Very suitable blends are obtained when the $S_2U$ triglyceride component comprises SLnS and SOS triglycerides in a weight ratio of SLnS/SOS <0.35 (S=saturated fatty acid $C_8$–$C_{24}$; Ln=$C_{18:2}$; O=$C_{18:1}$).

It was found that the good product performance obtained, using fats high in Ln, can be further improved by applying fats with such ratios for SLnS: SOS. In particular, the crystallisation rate is faster and processing becomes easier.

We further found that the crystallisation rate is far better for fats containing linoleic acid residues if the linoleic present in the 2-position of the $SU_2$-triglyceride is less than 50%, preferably less than 30%, of the total unsaturated fatty acids present in the 2-position of these $SU_2$-triglycerides.

In order to achieve better structuring properties, we prefer that the triglyceride component of our blends also comprises 0.1–10 wt. % of a trisaturated triglyceride, in particular a palm oil stearin or a by-product of an enzymic fat preparation.

Part of our invention is also a filling fat composition comprising a blend according to our invention, which blend contains 35–75 wt. %, preferably 40–65 wt. %, of the triglyceride component mentioned above and at least a sugar component. These filling fat compositions preferably also contain one or more of the following components: milk powder; skimmilk powder; proteins, in particular whey powder or caseinate; a filling component, in particular cellulose or inulin.

The filling fat compositions can contain the blend of fat and sugar per se or this blend can first be used for the preparation of a fat-continuous aqueous emulsion, which emulsion then can be part of the filling fat composition. If an emulsion is made first, this emulsion should contain 5–50 wt. % of fat and not more than 25 wt. % of water.

The filling fat compositions of the invention can be prepared by mixing of our blend of fat and sugar with the other ingredients for the filling, such as milk powder and/or other filling components. It is important, however, that the blend thus obtained be tempered at a temperature below 20° C., in particular below 15° C. This low tempering temperature is conducive to the formation of crystals. Another method for the production of our filling fat compositions comprises blending of the components at temperatures above 40° C., cooling the blend to 5°–25° C. and adding a working amount of seed crystals having a particle size of 1–200 μm, preferably 10–100 μm. As seeds, triglycerides high in SOS, SSO or $S_3$ can be applied (S=$C_{16}$–$C_{24}$ saturated fatty acid; O=oleic acid). Suitable working amounts are 0.01–1 wt. %, calculated on the fat.

Encapsulated filling fat compositions, wherein the filling fat according to the invention is encapsulated in a chocolate or chocolate-like coating material, are also part of the invention.

Encapsulated, low-calorie filling fat compositions are obtained by encapsulating the filling fat compositions containing the fat-continuous aqueous emulsion, e.g. in a chocolate shell. A further calorie reduction is obtained when at least part of the sugar component present in these compositions consists of polydextrose.

We further found that our blends can be successfully used in ice-cream coatings. So, an ice-cream coating comprising 40–75 wt. % of the triglyceride component mentioned above and at least a sugar is also part of our invention. Very suitable blends, in particular those suitable for the preparation of non-brittle, non-adhering ice-cream coatings, are obtained by applying fats with a non-stabilized N-line of: $N_0$=60–95; $N_{20}$=10–45 and $N_{25}$<5. This additional criterion for the fats thus means a selection within the fats that have been formulated above.

Coated ice creams are, of course, also part of our invention.

EXAMPLES

I. Fillings A and B

I.1 Fillings were made, using the following recipe:

|  | wt. % |
|---|---|
| Fat phase | 50.0 |
| Sugar | 40.0 |
| Skimmilk powder | 10 |
| Lecithin | 0.3 |

Two different fillings were made, using two different fat phases, i.e.

filling A, using fat A (rich in StOO), filling B, using fat B (a mixture of palm fractions), the composition of fats A and B being:

|  | Fat A (wt. %) | Fat B (comparative) (wt. %) |
|---|---|---|
| $SU_2$ | 77.9 | 27.0 |
| $S_2U$ | 17.3 | 64.0 |
| SAFA | 37.7 | 53.1 |
| $N_{20}$ | 51.2 | 48.0 |
| $N_{30}$ | 0.5 | 5.0 |
| $N_{20}$/SAFA | 1.35 | 0.9 |

I.2 The fillings were made by mixing of the ingredients, refining the blend on a 3-roll refiner and conching the blend. Filling A was tempered at 10° C.; filling B was tempered at 24° C. The fillings were stored at 7° C. for 16 hours and then further stored at 13° C.

I.3 After 1 week, the fillings were evaluated by a trained panel (at 20° C.).

The hardness of the two fillings was similar but the meltdown of filling A was much quicker, while this filling A was also much cooler during melting than filling B.

So, filling A is lower in SAFA and displays better oral properties than filling B.

II Filling C

II.1 One more filling (=C) was made, using the recipe of Example I.1. The fat applied (=fat C), however, had the following composition:

|  | Fat C (rich in BOO) (wt. %) |
|---|---|
| $SU_2$ | 73.6 |
| $S_2U$ | 22.6 |
| SAFA | 45 |
| Behenic % | 37.2 |
| $N_{20}$ | 81.2 |
| $N_{30}$ | 0.6 |
| $N_{20}$/SAFA | 1.8 |

II.2 The fillings were made according to I.2; tempering, however, was performed at 18° C.

II.3 After 1 week, applying a temperature of 20° C., we found that the hardness of filling C was similar to that of filling B (44 and 42, respectively). An expert panel found that the meltdown and coolness of fillings B and C were also similar.

So, a filling with lower SAFA and lower calorie intake and with similar hardness and oral properties was obtained.

III Fillings D and E

III.1 Two more fillings (D and E) were prepared, using the following recipes:

|  | D | E |
|---|---|---|
| BOO-rich fat C | 45 | 40 |
| Sugar | 35 | 35 |
| Skimmilk powder | 10 | 5 |
| Hazelnut paste | 10 | 20 |
| Lecithin | 0.4 | 0.4 |

So, the fat phase of filling D consists of 90% of BOO-rich fat and of 10% of hazelnut oil; the fat phase of filling E consists of 80% of BOO-rich fat and of 20% of hazelnut oil, the fat phases D and E having the following composition:

|  | Fat D (wt. %) | Fat E (wt. %) |
|---|---|---|
| $SU_2$ | 67.7 | 61.8 |
| $S_2U$ | 20.7 | 18.8 |
| SAFA | 41.7 | 38.4 |
| Behenic % | 33.5 | 29.8 |
| $N_{20}$ | 68.0 | 54.7 |
| $N_{30}$ | 0.6 | 0.1 |
| $N_{20}$/SAFA | 1.6 | 1.4 |

III.2 The fillings were made according to I.2. Tempering was performed at 5° C.

III.3 From an evaluation by an expert panel it could be concluded that low-SAFA, low-calorie fillings were obtained that displayed good hardness, good meltdown, good cool-melting and excellent flavour release properties.

IV. Fillings using seeding

IV.1 A filling composition was made with the recipe according to filling D of Example III. The filling was placed in an LFRA kettle at 50° C. and was cooled with stirring to 17° C.

IV.2 When the filling reached 17° C., it was seeded with 0.1 wt. % of cocoa butter seeds with stirring. Stirring was continued for half an hour at 17° C.

IV.3 After half an hour, Al-cups were filled and placed in a wind-cooled cabinet at 14° C. for an hour.

IV.4 The samples were kept in a storage cabinet at 13° C. for 18 hours, after which time Stevens hardness was measured. A hardness of about 420 was found.

IV.5 The samples were restored at 20° C. for 24 hours and Stevens hardness was measured again. A hardness of about 158 was found.

IV.6 All products had excellent oral properties and good flavour.

V. Ice-cream coatings F and G

V.1 Two ice-cream coatings were made, using the following recipe:

|  | wt. % |
|---|---|
| Fat phase | 59.2 |
| Sugar | 25.8 |
| Cocoa powder | 13.0 |
| Skimmilk powder | 1.7 |
| Lecithin | 0.3 |

Coatings F and G were made, using, respectively, fats C and G (=cocoa butter) with the following compositions:

|  | Fat C (wt. %) | Fat G (= cocoa butter) (wt. %) |
|---|---|---|
| $SU_2$ | 73.6 | 8.2 |
| $S_2U$ | 22.6 | 89.8 |
| SAFA | 45.0 | 62.0 |
| Behenic % | 37.2 | — |
| $N_{20}$ (stab.) | 81.2 | 81.9 |
| $N_{30}$ (stab.) | 0.6 | 38.6 |
| $N_{20}$ (stab.)/SAFA | 1.8 | 1.3 |
| $N_0$ (not stab.) | 84 | — |
| $N_{20}$ (not stab.) | 36.6 | — |
| $N_{25}$ (not stab.) | 4 | — |

V.2 The coatings were prepared by mixing of the ingredients, refining the blend on a 3-roll refiner and conching.

The coatings were kept at about 40° C. and ice creams were dipped into the coating compositions.

V.3 Dripping times and drying times were measured. The weight of the coating was determined. An evaluation for brittleness was made.

The mean result of 10 determinations was found to be:

|  | Coating F | Coating G |
|---|---|---|
| Dripping time (sec.) | 8.0 | 8.6 |
| Drying time (sec.) | 54.4 | 53.0 |
| % Coating on total product | 23.3 | 20.6 |
| Brittleness | 5 | 2 |

(5 = not brittle; 1 = very brittle)

So, coatings could be made with a lower SAFA content and a lower calorie intake, leading to good-tasting, non-brittle, coated ice creams which can be processed in the same way as those of the comparative coating (=G) based on cocoa butter.

We claim:

1. Blend of a sugar component and a triglyceride component, containing 35–75 wt % of the triglyceride component, and wherein the triglyceride component comprises:

at least 40 wt. % of $SU_2$ triglycerides and

3–50 wt. % of $S_2U$ triglycerides, and wherein the $S_2U$-triglyceride component comprises SLnS and SOS triglycerides in a weight ratio of SLnS/SOS<0.35

(S=saturated fatty acid $C_{18}$–$C_{24}$; Ln=$C_{18:2}$; O=$C_{18:1}$), which triglyceride component is free of trans-unsaturated fatty acid residues, has a SAFA content of at most 45, and displays a solid fat content (N) at the temperature indicated of:

$N_{20}$>35, $N_{30}$<10, (N measured by NMR-pulse for fats stabilized for 40 hours at 20° C.), S being saturated fatty acid with 18–24 C atoms and U being unsaturated fatty acid with $\geq 18$ C atoms.

2. Blend according to claim 1, wherein the triglyceride component displays a ratio between its $N_{20}$ (stab. at 20° C.) and its SAFA content, or $N_{20}$/SAFA, of more than 1.2.

3. Blend according to claim 1, wherein the triglyceride component comprises BOO, StOO, OStO, OBO or mixtures thereof and is obtained by chemical or enzymic interesterification, optionally followed by fractionation (B=Behenic, St=Stearic; O=Oleic).

4. Blend according to claim 1, wherein the blend also comprises a liquid oil, is selected from the group consisting of soybean oil, sunflower oil, maize oil, olive oil or rapeseed oil.

5. Blend according to claim 4, wherein the blend comprises a liquid oil and a triglyceride rich in SOO (S=$C_{18}$–$C_{24}$ saturated; O=oleic) in a weight ratio of liquid oil: SOO= (10–90):(90–10).

6. Blend according to claim 1, wherein the triglyceride component comprises at least 10 wt. % of behenic acid.

7. Blend according to claim 1, wherein the $SU_2$-triglycerides comprises linoleic acid residues, which are distributed over the $SU_2$-triglycerides, in such a way that less than 50% of the total unsaturated fatty acids present in the 2-position consists of linoleic acid.

8. Blend according to claim 1, wherein the triglyceride component also comprises 0.1–10 wt. % of a trisaturated triglyceride, chosen from a palm oil stearin or a by-product of an enzymic fat preparation.

9. Filling fat composition comprising a blend according to claim 1, which blend contains 40–65 wt. %, of the triglyceride component.

10. Filling fat composition according to claim 9, wherein the composition also comprises one or more of the following components selected from the group consisting of milk powder; skimmilk powder; proteins chosen from whey powder or caseinate; a filling component chosen from cellulose or inulin.

11. Filling fat composition according to claim 10, wherein the blend of triglyceride component and sugar component is part of a fat-continuous aqueous emulsion comprises 5–50 wt. % of fat and not more than 25 wt. % of water.

12. Filling fat composition according to claim 11, wherein the sugar component at least partly consists of a polydextrose.

13. Encapsulated filling fat compositions, wherein the filling fat according to claim 9 is encapsulated in a chocolate or chocolate-like coating material.

14. Ice-cream coating composition comprising 40–75 wt. % of the triglyceride component of claim 1 and at least a sugar.

15. Coated ice creams, wherein the coating consists of the ice-cream coating according to claim 14.

16. Process for the preparation of filling fat compositions comprising mixing a fat blend containing a blend of a sugar component and a triglyceride component, containing 40–65 wt % of the triglyceride component, and wherein the triglyceride component comprises:

at least 40 wt. % of $SU_2$ triglycerides and

3–50 wt. % of $S_2U$ triglycerides, and wherein the $S_2U$-triglyceride component comprises SlnS and SOS triglycerides in a weight ratio of SlnS/SOS<0.35

(S=saturated fatty acid $C_{18}$–$C_{24}$; Ln=$C_{18:2}$; O=$C_{18:1}$1);

which triglyceride component is free of trans-unsaturated fatty acid residues, has a SAFA content of at most 45, and displays a solid fat content (N) at the temperature indicated of:

$N_{20}$>35, $N_{30}$<10, (N measured by NMR-pulse for fats stabilized for 40 hours at 20° C.), S being saturated fatty acid with 18–24 C atoms and U being unsaturated fatty acid with ≧18 C atoms and tempering the blend at a temperature below 20° C.

17. A process for the preparation of filling fat compositions which comprises mixing a sugar component and a triglyceride component at a temperature of 40° C. to form a blend containing 40–65 wt. % of the triglyceride component, and wherein the triglyceride component comprises:

at least 40 wt. % of $SU_2$ triglycerides and

3–50 wt. % of $S_2U$ triglycerides, and wherein the $S_2U$-triglyceride component comprises SLnS and SOS triglycerides in a weight ratio of SLnS/SOS<0.35

(S=saturated fatty acid $C_{18}$–$C_{24}$; Ln=$C_{18:2}$; O=$C_{18:1}$1), which triglyceride component is free of trans-unsaturated fatty acid residues, has a SAFA content of at most 45, and displays a solid fat content (N) at the temperature indicated of:

$N_{20}$>35, $N_{30}$<10, (N measured by NMR-pulse for fats stabilized for 40 hours at 20° C.), S being saturated fatty acid with 18–24 C atoms and U being unsaturated fatty acid with >18 C atoms, cooling the blend thus formed to a temperature of 5°–25° C., and adding to the blend a working amount of fat seeds having a particle size of 1–200 μm.

* * * * *